United States Patent
Obuchi et al.

(10) Patent No.: US 8,239,718 B2
(45) Date of Patent: *Aug. 7, 2012

(54) WIRELESS COMMUNICATION APPARATUS, TRANSMITTING METHOD AND RECEIVING METHOD

(75) Inventors: Kazuhisa Obuchi, Kawasaki (JP); Shinya Okamoto, Fukuoka (JP); Yoshinori Soejima, Fukuoka (JP); Akihide Otonari, Fukuoka (JP); Katsumasa Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 982 days.

This patent is subject to a terminal disclaimer.

(21) Appl. No.: 12/182,694

(22) Filed: Jul. 30, 2008

(65) Prior Publication Data

US 2009/0044067 A1 Feb. 12, 2009

(30) Foreign Application Priority Data

Aug. 8, 2007 (JP) ................... 2007-206182

(51) Int. Cl.
*G08C 25/02* (2006.01)
(52) U.S. Cl. ................. 714/748; 714/749; 714/750
(58) Field of Classification Search .......... 714/748
See application file for complete search history.

(56) References Cited

U.S. PATENT DOCUMENTS

| | | | |
|---|---|---|---|
| 7,936,735 B2 * | 5/2011 | Obuchi et al. | 370/338 |
| 8,009,596 B2 * | 8/2011 | Tomioka | 370/310 |
| 2002/0064167 A1 | 5/2002 | Khan et al. | |
| 2006/0002416 A1 | 1/2006 | Yagihashi | |
| 2008/0037547 A1 * | 2/2008 | Jang | 370/394 |
| 2008/0130534 A1 * | 6/2008 | Tomioka | 370/310 |
| 2008/0219291 A1 * | 9/2008 | Obuchi et al. | 370/469 |
| 2009/0044067 A1 * | 2/2009 | Obuchi et al. | 714/748 |
| 2009/0235137 A1 | 9/2009 | Umesh et al. | |

FOREIGN PATENT DOCUMENTS

| | | |
|---|---|---|
| CN | 1356803 | 7/2002 |
| EP | 1 959 604 | 8/2008 |
| JP | 200620044 | 1/2006 |
| JP | 2009-517930 | 4/2009 |
| WO | 2007/062599 | 6/2007 |
| WO | 2007/074845 | 7/2007 |

* cited by examiner

*Primary Examiner* — Kamini Patel
(74) *Attorney, Agent, or Firm* — Myers Wolin, LLC

(57) ABSTRACT

A wireless communication apparatus having a retransmission control unit configured to refer to identification information added to received retransmit data when a second retransmit request is performed after the first transmit request is performed, and not to use the received retransmit data for forming data when the received retransmit data corresponds to the first retransmit request based on the identification information, and to use the received retransmit data for forming data when the received retransmit data corresponds to the second retransmit request based on the identification information.

15 Claims, 10 Drawing Sheets

WIRELESS COMMUNICATION APPARATUS, TRANSMITTING METHOD AND RECEIVING METHOD

CROSS REFERENCE TO RELATED APPLICATION

This application is based upon and claims the benefit of priority of prior Japanese Patent Application No. 2007-206182, filed on Aug. 8, 2007, the entire contents of which are incorporated herein by reference.

BACKGROUND

1. Field

An aspect of the invention is related to a wireless communication apparatus, a transmitting method, and a receiving method for retransmitting.

2. Description of the Related Art

At present, a W-CDMA system as a third generation (3G) wireless communication system has been in widespread use. Moreover, a specification called HSDPA (High-Speed Downlink Packet Access) for speeding up (up to 14 Mbps) data communication in the W-CDMA system is beginning to be realized. Being an improved version of the 3G method, the HSDPA is also referred to as a 3.5G. The specification of the HSDPA is defined in detail by 3GPP (a 3rd Generation Partnership Project) which is a standardization organization for 3G wireless communication systems.

The HSDPA has the following characteristics:

(1) using one physical channel by sharing with a plurality of mobile terminals (UE) (e.g., by time-sharing according to a scheduling control);

(2) adaptively controlling a modulating method and/or an encoding method depending on a communication environment, wherein this control may be referred to as AMC (Adaptive modulation and coding) control; and (3) using a hybrid ARQ which is a combination of a retransmission control (Auto Repeat request (ARQ) control) and error-correcting encoding processing.

Next, protocol architecture of the HSDPA will be described by using FIG. 1.

FIG. 1 shows the protocol architecture corresponding to the HSDPA (particularly layer 2). In the HSDPA, the layer 2 includes sublayers of MAC (Medium Access Control)-hs, MAC-d, and RLC (Radio Link Control).

When receiving an IP data packet added with an IP header from a higher layer, an RLC layer processing unit of a transmitting side apparatus handles the IP data packet as an RLC SDU (Service Data Unit). The RLC layer processing unit divides the RLC SDU into a plurality of data and generates a plurality of the RLC PDUs by adding an RLC header including a sequence number sequentially to each of the divided data. The RLC PDU has a fixed length during communications. As described above, if the RLC PDU is shorter than the fixed length, padding bits are added to the shorter RLC PDU to obtain an RLC PDU having the fixed length. The generated RLC PDU is given to a MAC-d processing unit of a lower layer.

A format of an RLC PDU (Protocol Data Unit) is described as follows.

FIG. 2 shows an example of a format of the RLC PDU (Protocol Data Unit). The RLC PDU shown in FIG. 2 is an RLC PDU in an Acknowledge Mode in which a transmission confirmation control of data and a retransmission control of data are possible (this RLC PDU may be referred to as an RLC AMD (Acknowledge Mode Data) PDU, and the RLC PDU used below indicates the RLC AMD PDU). This RLC PDU includes a D/C bit for distinguishing between user data and control data, sequence information (a SN (Sequence Number)) indicating the order of the RLC PDUs, a polling bit P indicating the existence or nonexistence of a transmission confirmation request, an area HE (Header Extension Type) indicating extended information of the user data, a length indicator LI, an E bit, a data storing area (DATA), and a padding bit (PAD)/a piggyback (Piggybacked STATUS PDU).

In this case, the data size of the RLC PDU is fixed to, such as 42 oct, 82 oct, or 122 oct (1 oct (octet) is 8 bits) and is not changed during communications. The RLC PDU is identified by the sequence number SN. For example, the sequence number SN is a number from 0 to the maximum number of 4095.

The RLC PDU generated in the RLC layer is given to the MAC-d processing unit. A MAC-d PDU is generated by adding a MAC-d header to the RLC PDU. A plurality of the MAC-d PDUs are made into a group to be given to a MAC-hs processing unit.

The MAC-hs processing unit generates a MAC-hs PDU which includes a plurality of the MAC-d PDUs in a data part and to which a MAC-hs header is added.

The MAC-hs PDU is given to a physical layer processing unit to be transmitted within one transmission period (TTI) and is transmitted though a HS-PDSCH (High Speed Physical Downlink Shared Channel). In advance of the transmission, an advance notice of transmission (a notice of destination and transmission form) is given to a receiving side apparatus at the destination of the transmission through a HS-SCCH (High Speed Shared Control Channel).

In the receiving side apparatus, a physical layer processing unit performs a control for giving the received MAC-hs PDU to a MAC-hs layer processing unit. The MAC-hs layer processing unit terminates the MAC-hs header and gives a plurality of the MAC-d PDUs included in the data part to a MAC-d layer processing unit. The MAC-d layer processing unit terminates each header of the plurality of the MAC-d PDUs and gives the RLC PDUs corresponding to the data part of the MAC-d PDUs to an RLC layer processing unit.

When the RLC layer processing unit receives the RLC PDUs from the MAC-d layer processing unit in the lower layer, the RLC layer processing unit replaces the RLC PDUs based on a sequence number SN included in the RLC header, generates an RLC SDU by combining a plurality of the RLC PDUs according to the sequence, and transfers the RLC SDU to the higher layer. At this time, if a sequence number SN is lacking, the RLC layer processing unit performs the control related to the transmission of a retransmit request of the RLC PDU corresponding to the lacking sequence number SN. That is, the RLC layer processing unit of the receiving side apparatus generates a signal to request the RLC layer processing unit of the transmitting side apparatus to retransmit, and the receiving side transmits this generated signal to the transmitting side apparatus through the lower layer.

By storing the transmitted RLC PDU in a buffer (a memory), the RLC layer processing unit of the transmitting side apparatus stands by waiting for the retransmit request from the receiving side apparatus until a transmission confirmation notice is received from the RLC layer processing unit of the receiving side apparatus. The RLC layer processing unit of the receiving side apparatus has a buffer (the memory) for storing the RLC PDU to generate an RLC SDU. An RLC SDU is generated when all the RLC PDUs necessary to generate the RLC SDU are completed.

The RLC layer processing unit of the transmitting side apparatus performs the transmission confirmation control by setting the polling bit P included in the RLC PDU to "1". If the receiving side apparatus receives the RLC PDU in which the polling bit P is set to "1", the receiving side apparatus confirms whether or not the sequence number of the RLC PDU which has been so far received is lacking. If the sequence number is not lacking, a STATUS PDU (ACK) is replied. If the sequence number is lacking, the lacking information is sent with a STATUS PDU (NACK).

The receiving side apparatus has a timer to prevent a STATUS PDU reply from occurring frequently after sending the STATUS PDU. If the receiving side apparatus notifies the transmitting side of the lacking information with the NACK, the timer is started at that time and a next STATUS PDU is not sent until the timer expires.

The transmitting side apparatus starts a timer after transmitting the transmission confirmation request. If the STATUS PDU reply is not received from the receiving side before the timer expires, it is determined that the data is lost, or the like, in wireless communication and the transmitting side apparatus again transmits a RLC PDU in which the polling bit P is set to "1". If the transmitting side apparatus receives the STATUS PDU (ACK), it is determined that the RLC PDUs have been successfully transmitted/received so far. On the other hand, if the transmitting side apparatus receives the retransmit request with the STATUS PDU (NACK) from the receiving side apparatus, the transmitting side apparatus retransmits the RLC PDU requested.

The Japanese Laid-Open Patent Publication No. 2006-20044 discloses a memory management method. In the memory management method, in the MAC-hs sublayer, the MAC-hs PDU, which is variable length data, is divided into RLC PDU units and stored in a shared memory (a buffer) with the sequence number. Thus, it is possible to limit the increase of the memory size without using a complicated memory control method.

The above described 3.5G mobile communication system using HSDPA is expected to achieve a higher speed and a larger capacity in the fourth generation (4G) at an early stage.

Before the transition to a fourth generation, it is scheduled to proceed to one more stage called 3.9G (LTE (Long Term Evolution) ). A communication speed of the LTE is expected to be up to 100 Mbps. In the 3GPP, as a specification of the LTE at present, it is being discussed that the fixed length RLC PDU becomes variable length in the communication shown in FIG. 1 and FIG. 2. Moreover, in a case when re-transmission of the RLC PDU is performed because of the lacking RLC PDU, it is being discussed that the RLC PDU may be divided into a plurality of variable length RLC Sub PDUs to be retransmitted depending on radio line qualities or the like.

However, the retransmission by transmitting the divided RLC PDU causes confusion in the receiving side apparatus because the receiving side apparatus does not know which divided PDU (RLC Sub PDU) should be used or discarded in order to generate an RLC PDU.

Other than the case when the RLC Sub PDU is divided and retransmitted, such confusion may occur when a plurality of the retransmissions occur in a situation in which the cut portion (division of data unit) of the data unit in the $M+1^{th}$ retransmission can be different from the cut portion of the data unit in the $M^{th}$ retransmission, in case the $M+1^{th}$ retransmission is performed when the retransmit request of the data related to the $M^{th}$ retransmission is received.

SUMMARY

Accordingly, it is an object of the invention to avoid the confusion in combining data when a plurality of the retransmissions occur.

It is an object of the invention to provide a wireless communication apparatus in which an RLC PDU can be generated with the received RLC Sub PDUs even though the RLC Sub PDU becomes variable length and the division form of the RLC PDU can vary depending on the transmission (retransmission) of the RLC Sub PDU.

According to an aspect of the invention, a wireless communication apparatus which performs an $M+1^{th}$ retransmission when receiving a retransmit request of data related to an $M^{th}$ retransmission, and is able to set a cut portion(divide the data) of a data unit in the $M+1^{th}$ retransmission differently from a cut portion (a division of the data) of the data unit in the $M^{th}$ retransmission, the wireless communication apparatus having a retransmission control unit configured to add identification information to the data unit transmitted by the $M^{th}$ retransmission and to the data unit transmitted by the $M+1^{th}$ retransmission, respectively, and a transmitting unit configured to transmit the data unit transmitted by the $M^{th}$ retransmission and the data unit transmitted by the $M+1^{th}$ retransmission is utilized. The identification information is capable of identifying a data unit transmitted by a different retransmission between the data unit transmitted by the $M^{th}$ retransmission and the data unit transmitted by the $M+1^{th}$ retransmission.

According to an aspect of the invention, a wireless communication apparatus which generates variable length RLC Sub PDU data, the wireless communication apparatus having a generating unit configured to generate a plurality of RLC Sub PDU data by dividing a RLC PDU data, and a retransmission control unit configured to transmit the plurality of RLC Sub PDU data, each of which is added with first generation identification information, and to transmit a RLC Sub PDU data to which second generation identification information different from the first generation identification information is added when the wireless communication apparatus receives a retransmission request with respect to any of the plurality of RLC Sub PDU data, wherein the RLC Sub PDU data to which the second generation identification information is added corresponds to data for which retransmission is requested by the retransmission request is utilized.

According to an aspect of the invention, a wireless communication apparatus which receives data related to an $M+1^{th}$ retransmission performed by performing a second retransmit request of the data related to an $M^{th}$ retransmission performed in response to a first retransmit request, the wireless communication apparatus having a retransmission control unit configured to refer to identification information added to received retransmit data when the second retransmit request is performed after the first transmit request is performed and not to use the received retransmit data for forming data when the received retransmit data corresponds to the first retransmit request based on the identification information and uses the received retransmit data for forming data when the received retransmit data corresponds to the second retransmit request based on the identification information is utilized.

According to an aspect of the invention, a wireless communication apparatus which receives variable length RLC Sub PDU data and generates an RLC PDU data based on the received RLC Sub PDU data, the wireless communication apparatus having a memory unit and a retransmission control unit configured to refer to generation identification information included in the received RLC Sub PDU data to determine whether or not the generation identification information corresponds to expected (assumed) generation identification information and to store the RLC Sub PDU data in the memory unit if the generation identification information corresponds to the expected generation identification information and to generate RLC PDU data based on the data stored in the memory unit is utilized.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

A preferred embodiment of the present invention will be explained with reference to accompanying drawings.

Figure 1:
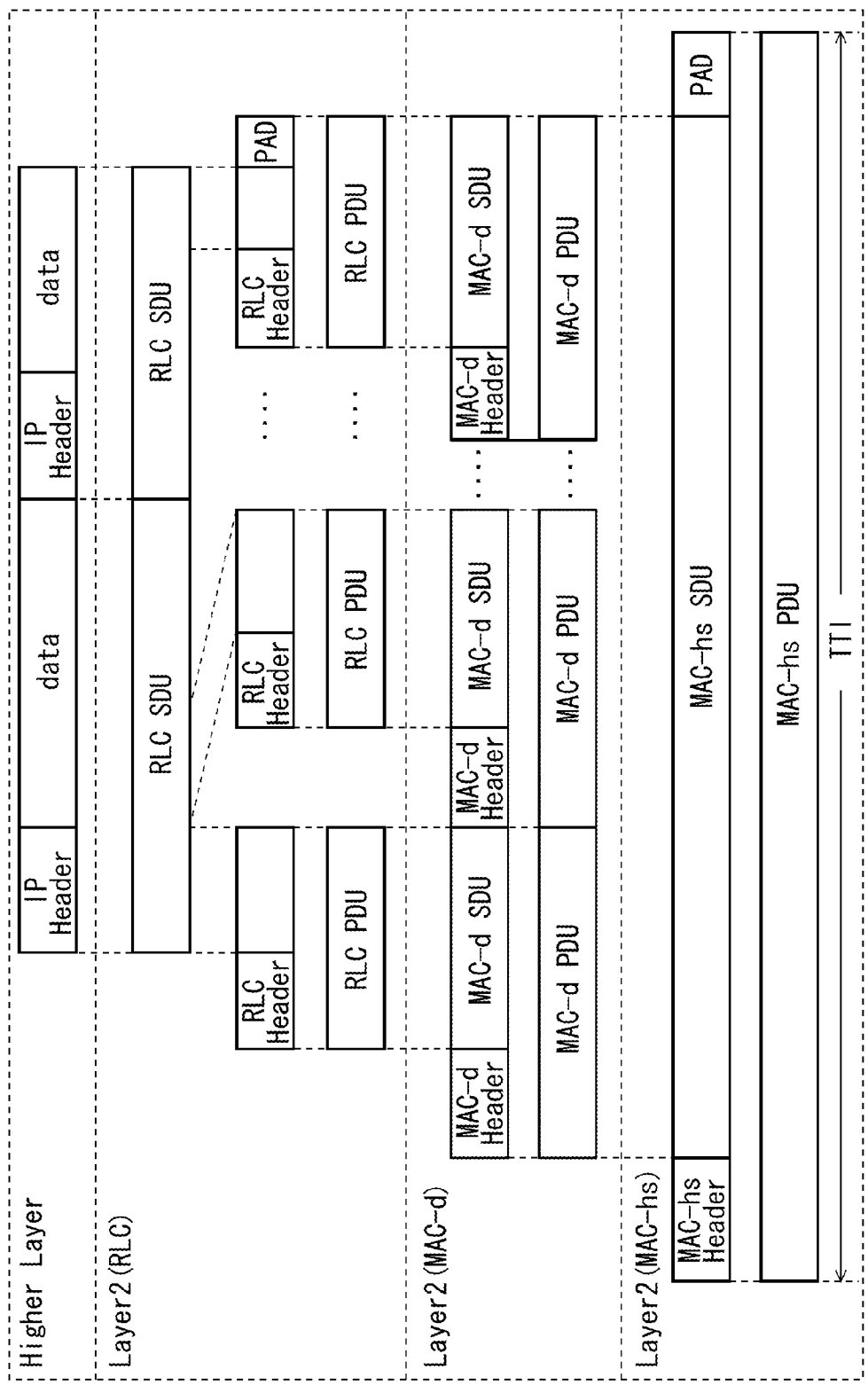
FIG. 1 is an example of a protocol architecture corresponding to the HSDPA.
Figure 2:
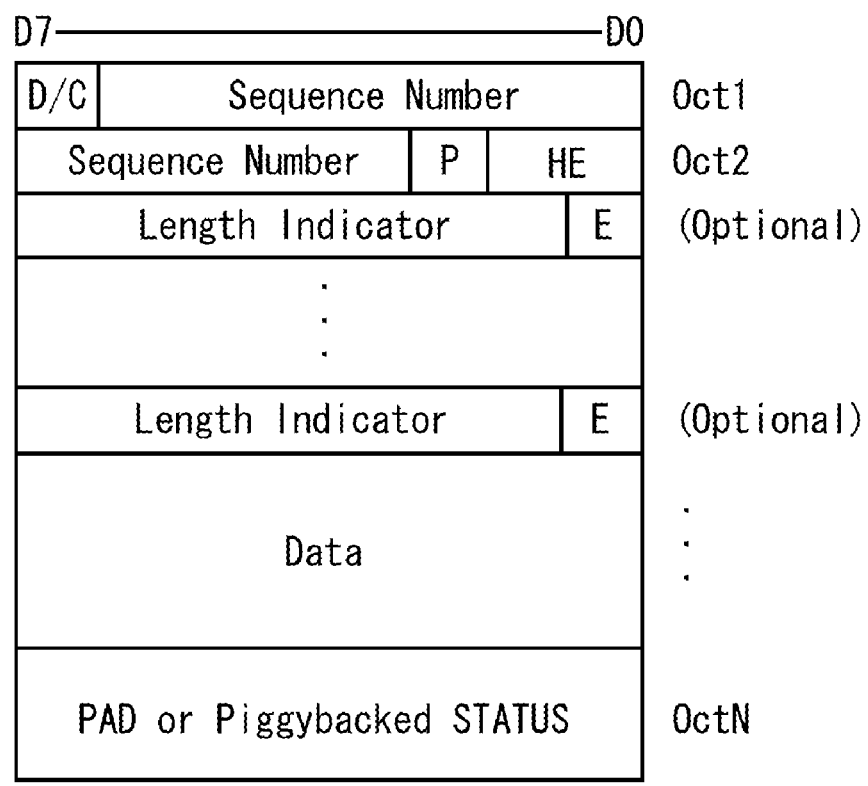
FIG. 2 is an example of a format of the RLC PDU (Protocol Data Unit).
Figure 3:
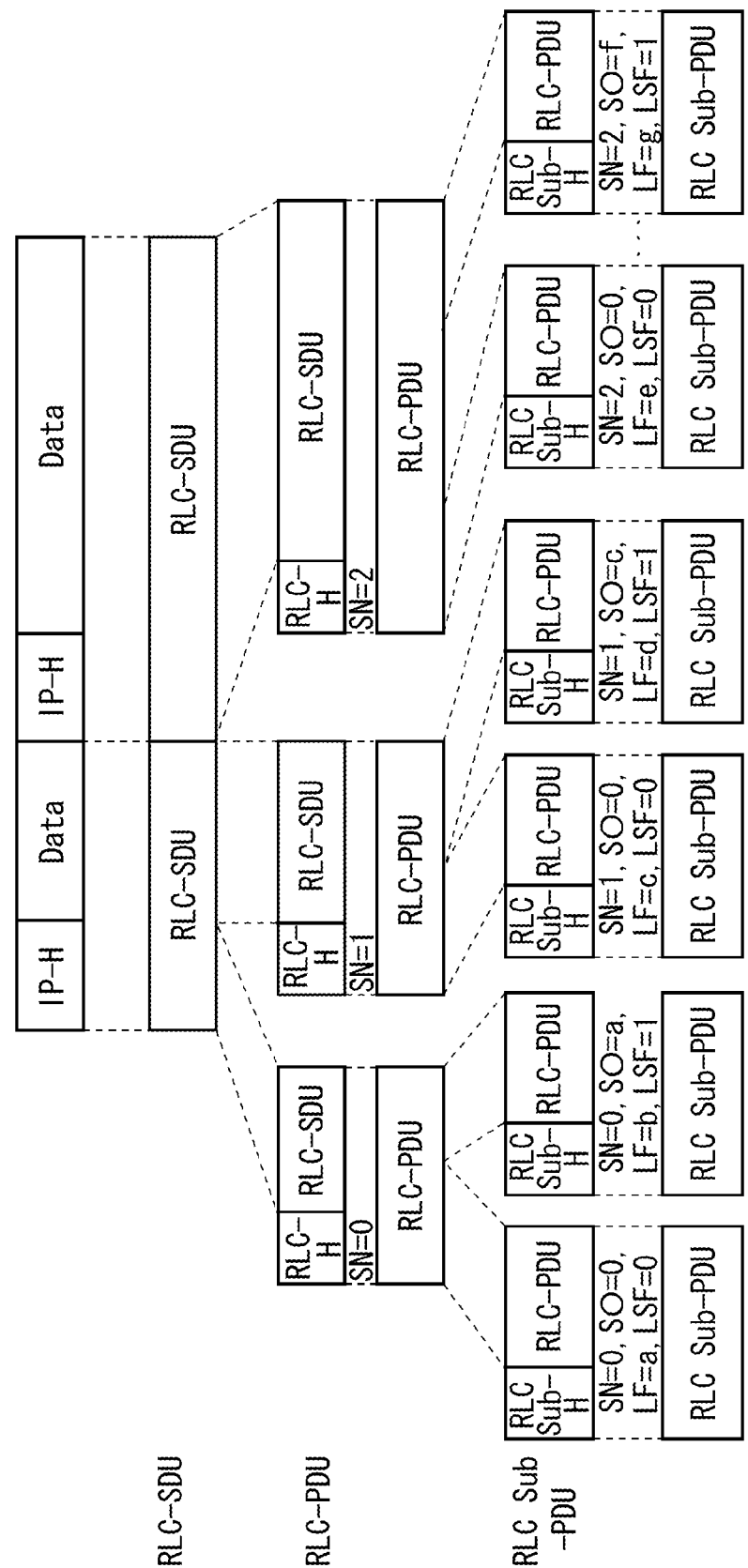
FIG. 3 is a processing method in an RLC sublayer.

FIG. 3 shows an idea of a processing method in the RLC sublayer when the RLC Sub PDU has variable length. As shown in FIG. 3, when the RLC Sub PDU has variable length, the sequence number SN of the RLC Sub PDU takes over the sequence number SN included in the header of the RLC PDU as the number for identifying the RLC PDU. Moreover, a SO (Segment Offset) is used as starting position information indicating a position where the RLC Sub PDU starts in the RLC PDU, a LF (Length Field) is used as a value indicating a size of the RLC Sub PDU, and a LSF (Last Segment Flag) is introduced as a value indicating whether or not the RLC Sub PDU is in the last part in the RLC PDU. Processing of the MAC-d, the MAC-hs layer or the like is substantially the same as described above.

Figure 4:
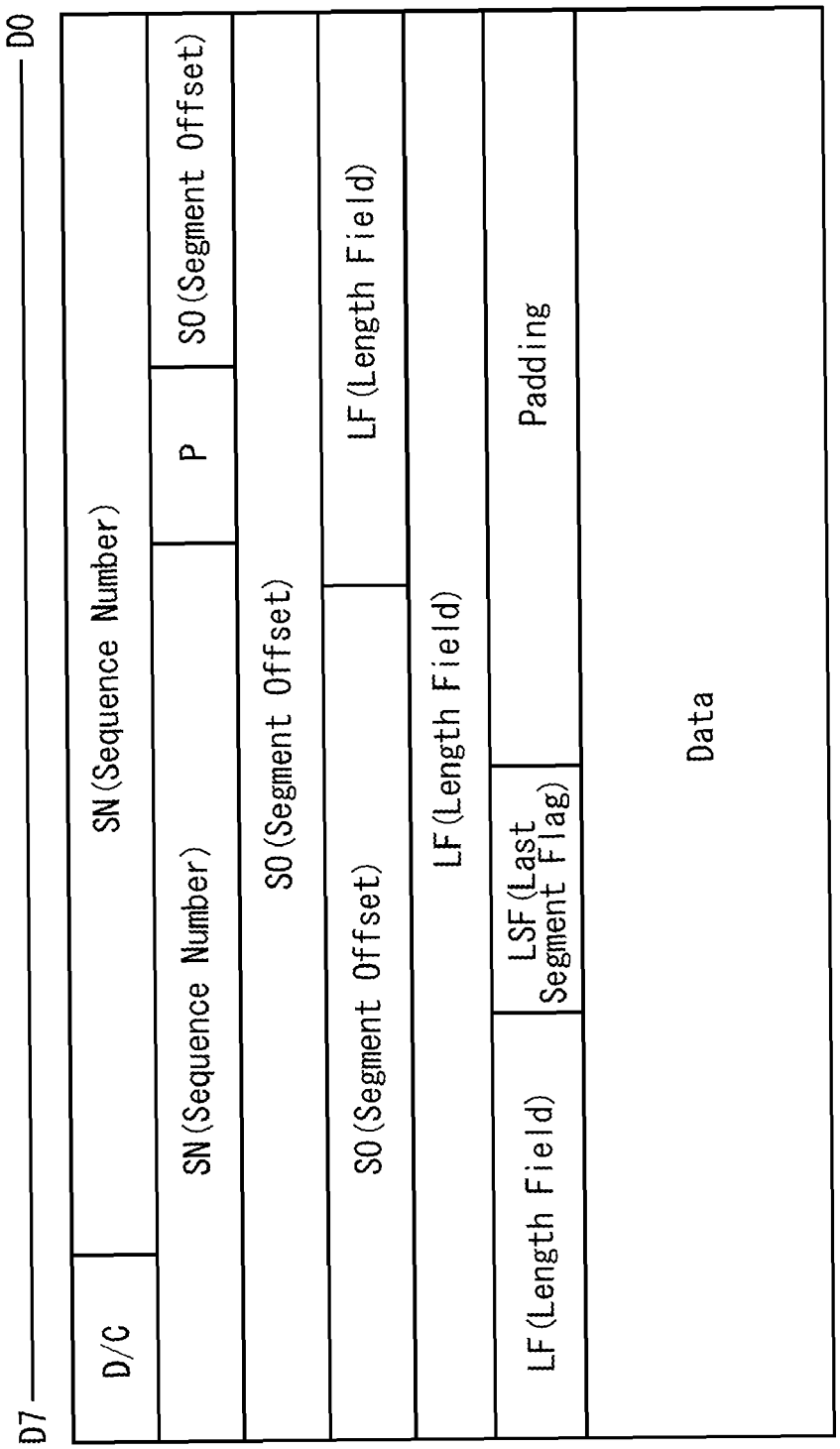
FIG. 4 is an example of a format when an RLC Sub PDU has variable length.

FIG. 4 shows a format example when an RLC Sub PDU has variable length.

Since the RLC Sub PDU corresponds to a part of the RLC PDU, it is preferable to use the sequence number SN added to the RLC PDU for a code identifying the RLC Sub PDU in order to identify which RLC PDU the RLC Sub PDU corresponds to. Moreover, it is preferable to introduce a segment offset SO and a length field LF as a code identifying which part of the RLC PDU was retransmitted. The LSF (Last Segment Flag) indicates a last segment of the division of the RLC PDU.

There is the following problem in the retransmission control when the RLC Sub PDU has variable length. It is envisaged that a retransmission unit is changed to an RLC Sub PDU unit in which the lacking RLC Sub PDU is confirmed in order to change the size for dividing the data of the RLC Sub PDU at every retransmission in accordance with a change of the radio link qualities or the like. In this case, if at least one lacking RLC Sub PDU is determined out of the plurality of the RLC Sub PDUs, into which a certain RLC PDU is divided, a STATUS-PDU (NACK) is replied and a retransmit request is transmitted to the transmitting side apparatus. The rest of the RLC Sub PDUs received by the receiving side apparatus are set aside to combine with the RLC Sub PDU which is to be retransmitted.

However, if the RLC PDU to be retransmitted is divided into a plurality of RLC Sub PDUs, it may be recognized that a certain RLC Sub PDU is lacking before all of the RLC Sub PDUs corresponding to such RLC PDU are received. In such case, however, the lacking RLC Sub PDU which is recognized after the STATUS-PDU (NACK) is sent, may be received at a later time because of a transmission delay or the like. In this case, the RLC Sub PDU of the RLC PDU which is newly requested to be retransmitted is presumed to be also received in a later stage.

In such case, the receiving side apparatus can not recognize whether the received RCL Sub PDU is the data retransmitted in response to the prior retransmit request or to this retransmit request, so that confusion may be caused at the time of combining the data.

The above described problem will be described in detail by using FIG. 5 and FIG. 6.

Figure 5:
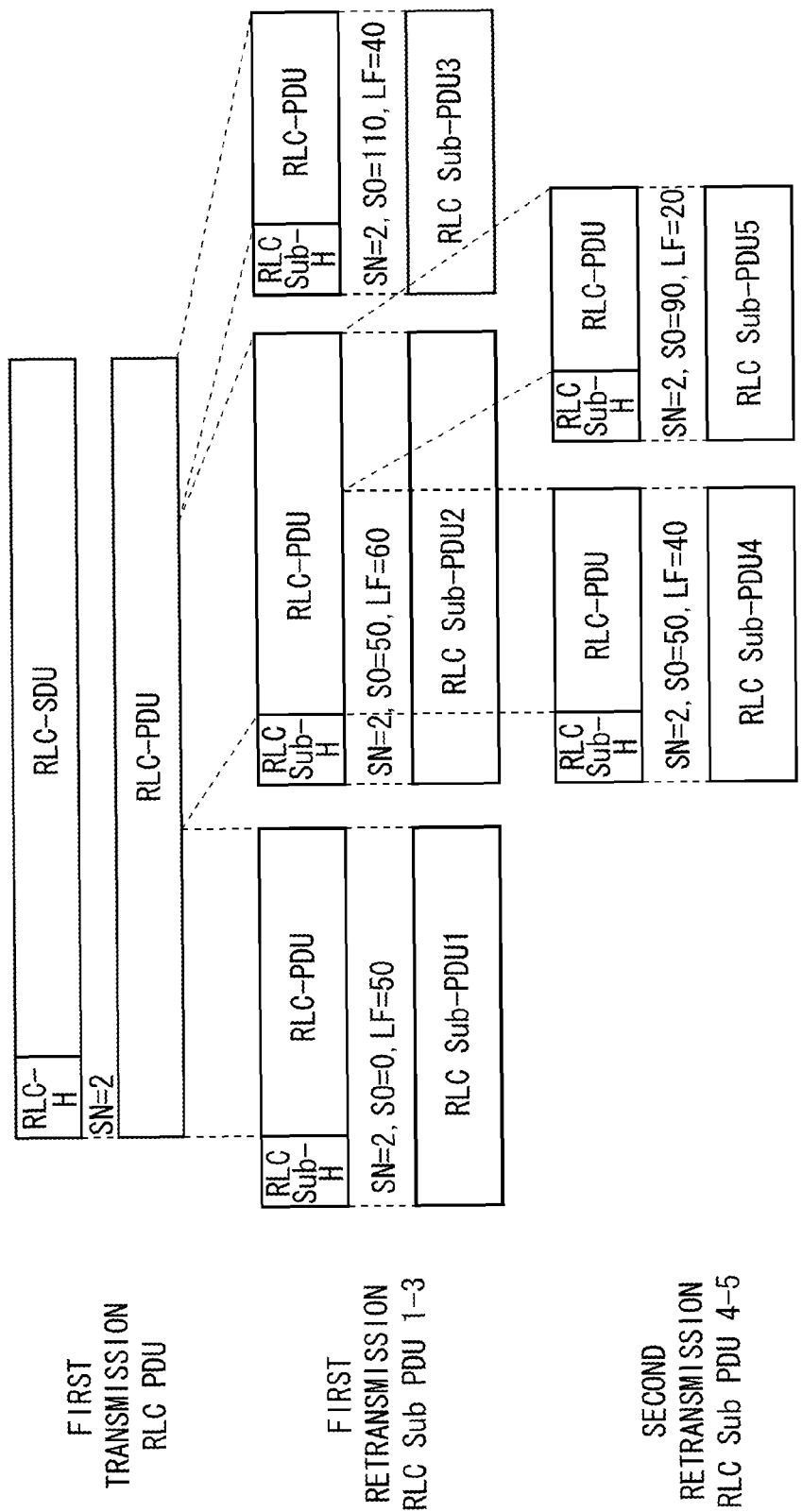
FIG. 5 is an example where the RLC Sub PDU related to the first retransmission and the RLC Sub PDU related to the second retransmission are mixed.
Figure 6:
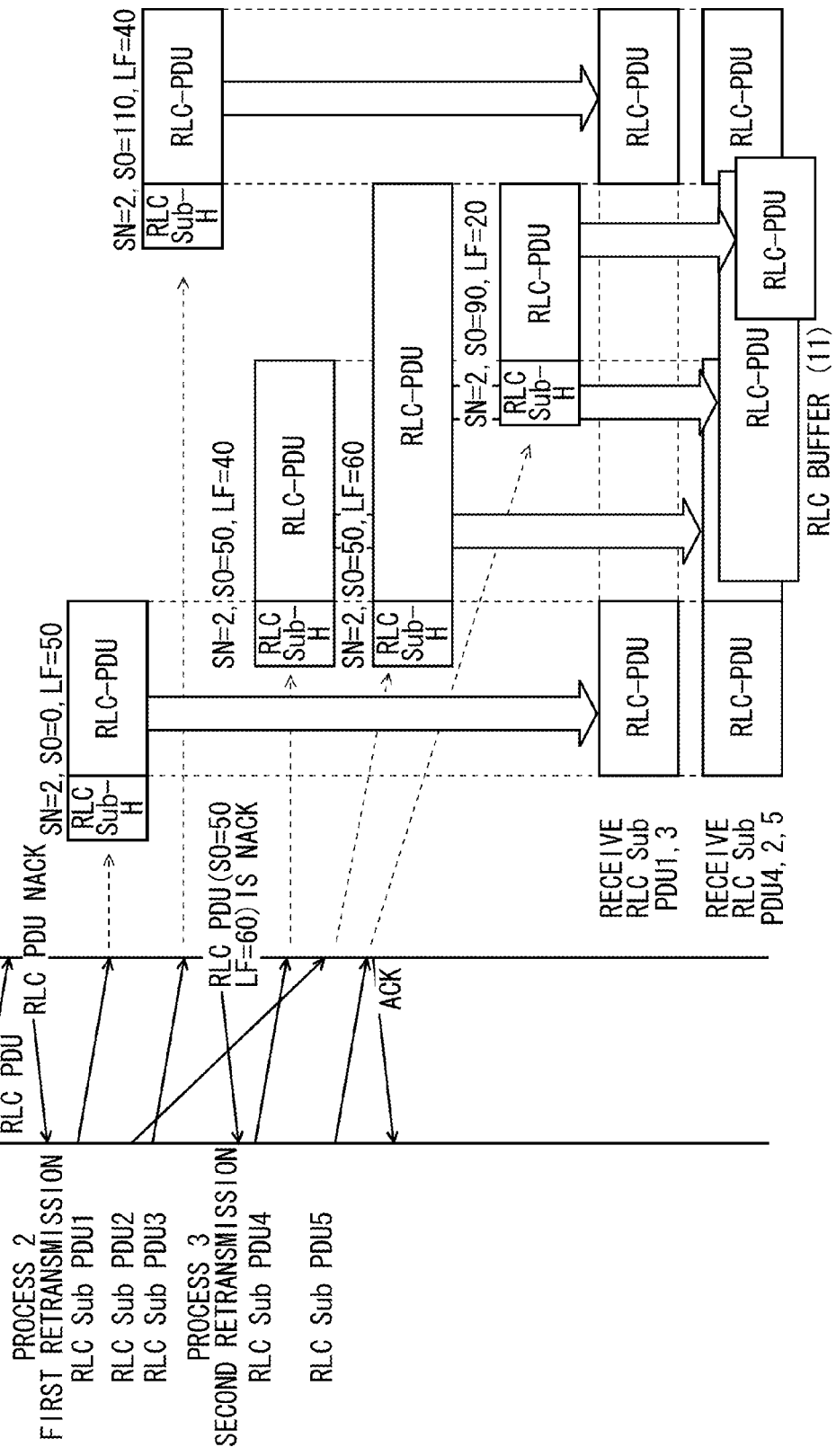
FIG. 6 is an example where the RLC Sub PDU related to the first retransmission and the RLC Sub PDU related to the second retransmission are mixed.

FIG. 5 and FIG. 6 show an example where the RLC Sub PDU related to the first retransmission and the RLC Sub PDU related to the second transmission are mixed. The variable length RLC Sub PDUs are transmitted in the format of FIG. 4, and the received RLC Sub PDUs are stored sequentially in the buffer memory of the receiving side apparatus.

In FIG. 5 (First Transmission RLC PDU) and FIG. 6 (Process 1), the receiving side apparatus transmits an RLC PDU with the SN=2 in a first transmission. However, since the receiving side apparatus could not receive the RLC PDU successfully, a STATUS PDU (NACK) is transmitted from the receiving side apparatus as shown in FIG. 6. The transmitting side apparatus receives this STATUS PDU (NACK) and performs the retransmission of the RLC PDU with the SN=2. At this time, the transmitting side apparatus divides the RLC PDU by, for example, three as shown in FIG. 5 (First Retransmission RLC Sub PDU1-3), to retransmit RLC Sub PDUs 1, 2 and 3 as shown in FIG. 6(Process 2). The receiving side apparatus successfully received the RLC Sub PDU1 and the RLC Sub PDU3, but did not receive the RLC Sub PDU2. Thus, the NACK signal including the lacking information (the SN=2, the SO=50, the LF=60 (lacking from the 50th octet to the 60th octet with the SN=0)) is transmitted to the transmitting side apparatus. As shown in FIG. 6, the transmitting side apparatus receives the STATUS-PDU (NACK) and performs the retransmission with respect to the RLC PDU with the SN=2. At this time, the transmitting side apparatus further divides the RLC Sub PDU2 by, for example, two, as shown in FIG. 5(Second Retransmission RLC PDU 4-5) and generates and transmits an RLC Sub PDU4 and an RLC Sub PDU5 in the retransmission as shown in FIG. 6 (Process 3). The division number may vary in real time depending on a condition and a quality of the radio link.

The receiving side apparatus receives the RLC Sub PDU4 and the RLC Sub PDU5. This means that the receiving side apparatus receives the RLC PDU completely and can generate an RLC PDU by combining the RLC Sub PDUs.

However, in fact, since the receiving side apparatus also receives the RLC Sub PDU2 transmitted by the first retransmission (see FIG. 6 (Process 2)) before receiving the RLC Sub PDU4 and the RLC Sub PDU5, the receiving side apparatus does not know which RLC Sub PDU should be used or discarded in order to generate an RLC PDU, which causes confusion.

Other than the case when the RLC Sub PDU is divided and retransmitted, such confusion may occur when a plurality of retransmissions occur in a situation in which the cut portion of the data unit in the M+1$^{th}$ retransmission can be different from the cut portion of the data unit in the M$^{th}$ retransmission in case the M+1$^{th}$ retransmission is performed when the retransmit request of the data related to the M$^{th}$ retransmission is received.

Therefore, in the following embodiments the confusion in combining data when a plurality of retransmissions occur is avoided.

Also, a wireless communication apparatus in which an RLC PDU can be generated with the received RLC Sub PDUs even though the RLC Sub PDU has variable length and the division form of the RLC PDU can vary depending on the transmission (retransmission) of the RLC Sub PDU is provided.

Figure 7:
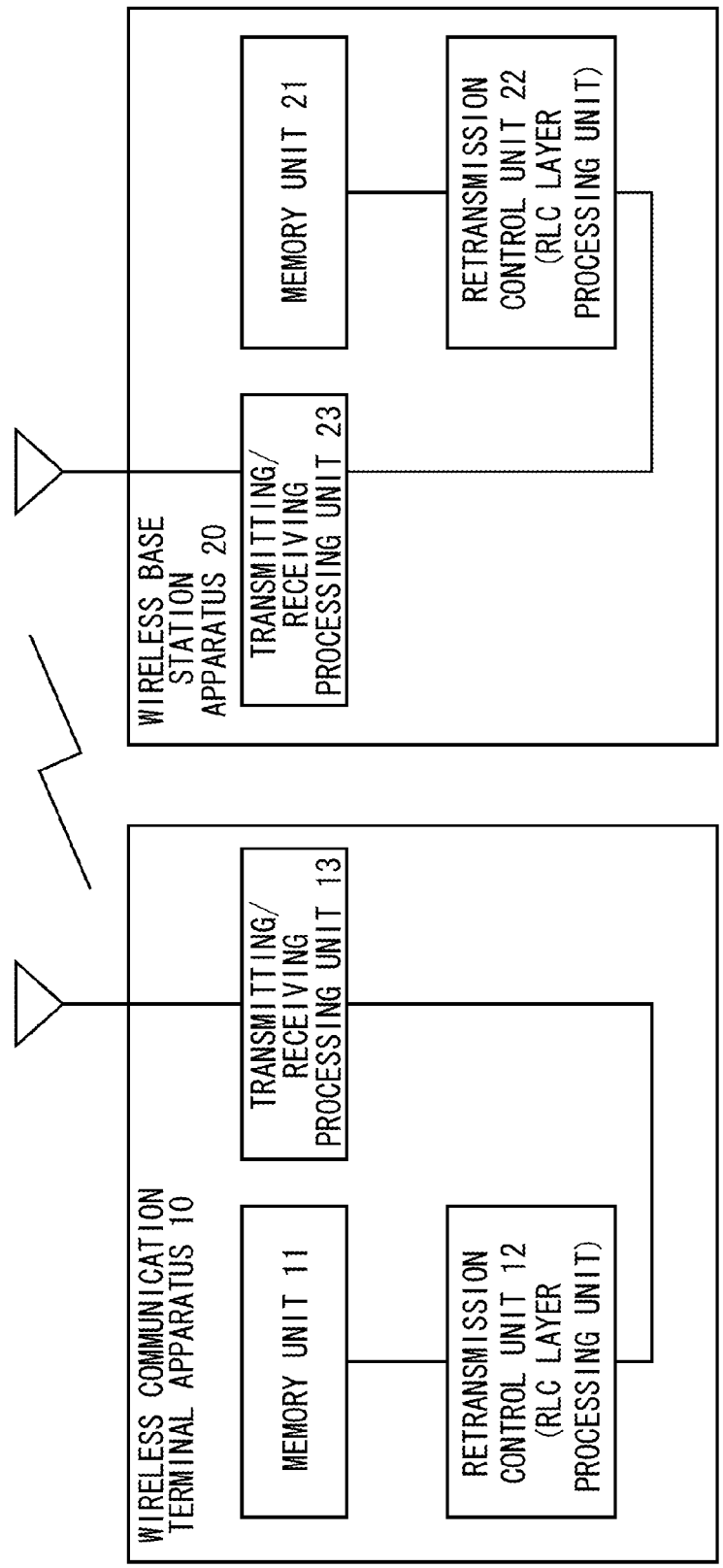
FIG. 7 is an example of a configuration of a wireless communication apparatus.

FIG. 7 shows a configuration of a wireless communication apparatus according to an embodiment.

In FIG. 7, a wireless communication terminal apparatus 10 and a wireless base station apparatus 20 are given as examples of the wireless communication apparatus. As shown in FIG. 7, the wireless communication terminal apparatus 10 and the wireless base station apparatus 20 include memory units 11 and 21, retransmission control units 12 and 22, and transmitting/receiving processing units 13 and 23, respectively. The retransmission control units 12 and 22 perform the control related to the transmission and can be, for example, an RLC layer processing unit which performs processing in the RLC layer. The memory units 11 and 21 can be accessed by the RLC layer processing unit. The retransmission control units 12 and 22 can perform a reading and writing control of the necessary data for the memory units 11 and 21. The transmitting/receiving processing apparatus 13(23) wirelessly transmits the data generated in the retransmission control units 12(22) to the other apparatus (the radio communication partner) and wirelessly receives the data generated in the retransmission control unit 22(12) from the other apparatus for mutual wireless communication.

The embodiment described below shows an example of the RLC layer processing unit used as a retransmission control unit. When the embodiment is applied in a downlink such as HSDPA, the wireless communication terminal apparatus 10 is the wireless communication apparatus of the receiving side and the wireless base station apparatus 20 is the wireless communication apparatus of the transmitting side. When the embodiment is applied to an uplink such as the HSUPA, the wireless terminal apparatus 10 is the communication apparatus of the transmitting side and the wireless base station apparatus 20 is the wireless communication apparatus of the receiving side.

Description will be made of an example of a case of the downlink in which the wireless communication terminal apparatus 10 is the receiving side apparatus and the wireless base station apparatus 20 is the transmitting side apparatus. However, in a case of the uplink, the below described embodiment can be applied as well by replacing the position of the wireless communication terminal apparatus 10 with the position of the wireless base station apparatus 20. The retransmission control units (hereinafter referred to as an RLC layer processing unit) 12 and 22 can be comprised of hardware, software, or the both.

As described below, when the RLC layer processing units 12 and 22 are applied at the transmitting side, different data units are transmitted by dividing when the data used in the M$^{th}$ retransmission is retransmitted by the M+1$^{th}$ retransmission. In other words, the M+1$^{th}$ retransmission is performed if the retransmit request of the data related to the M$^{th}$ retransmission is received. The cut portion of the data unit in the M+1$^{th}$ retransmission can be different from the cut portion of the data unit of the Mth retransmission.

For example, as shown in FIG. 5, a plurality of the RLC Sub PDUs, which were obtained by dividing the RLC PDU, are generated and transmitted in the M$^{th}$ retransmission (M=1 in this case). The RLC PDU2 (the data used in the M$^{th}$ retransmission) is divided in a plurality of RLC Sub PDUs, and the plurality of the RLC Sub PDUs (two RLC Sub PDUs in this case), i.e., the RLC Sub PDU4 and the RLC Sub PDU5 obtained by the division, are transmitted. At this time, each of the data units to be retransmitted is added with identification information identifying either the data is related to the M$^{th}$ retransmission or to the M+1$^{th}$ retransmission. For example, the data retransmitted in the M$^{th}$ retransmission is added with 1 and the data retransmitted in the M+1$^{th}$ retransmission is added with 0. Retransmission identification information (identifying a retransmission from the other retransmission) can be a number. Thus, the data retransmitted by the M$^{th}$ retransmission can be added with the number value M, and the data transmitted by the M+1$^{th}$ retransmission can be added with the number value M+1.

As described above, the information which can at least identify either the data related to the M$^{th}$ retransmission or to the M+1$^{th}$ retransmission is referred to as generation identification information.

As described below, when the RLC layer processing units 12 and 22 are applied at the receiving side, the RLC layer processing units 12 and 22 refer to the retransmission identification information (generation identification information) in order to generate an RLC PDU. For example, the retransmit request of the M$^{th}$ retransmission is performed, the retransmission identification information (for example, M+1) is set in the RLC layer processing units 12 and 22 in response to this request, and the RLC Sub PDU having the identification information is stored in the memory unit 11. On the other hand, the RLC Sub PDU which does not have this retransmission identification information is not used to generate an RLC PDU. Preferably, the RLC Sub PDU is discarded and is not stored in the memory unit 11.

The retransmission identification information to be set is updated every time the retransmit request is performed. Even though the RLC Sub PDU having un-updated retransmission identification information (previous retransmission identification information) received after the retransmission identification information is updated, the RLC Sub PDU is not used to generate an RLC PDU. Preferably, the RLC Sub PDU is discarded and is not stored in the memory unit 11.

When performing the retransmit request, the wireless communication apparatus of the receiving side includes the generation identification information, which is applied to the retransmission performed in response to the retransmit request, in this retransmit request. The wireless communication apparatus of the transmitting side can apply the generation identification information included in the retransmit request for a next retransmission which is to be performed in response to the retransmit request.

Next, an example of a format of RLC Sub PDU is explained.

First Example of a Format of RLC Sub PDU

Figure 8:
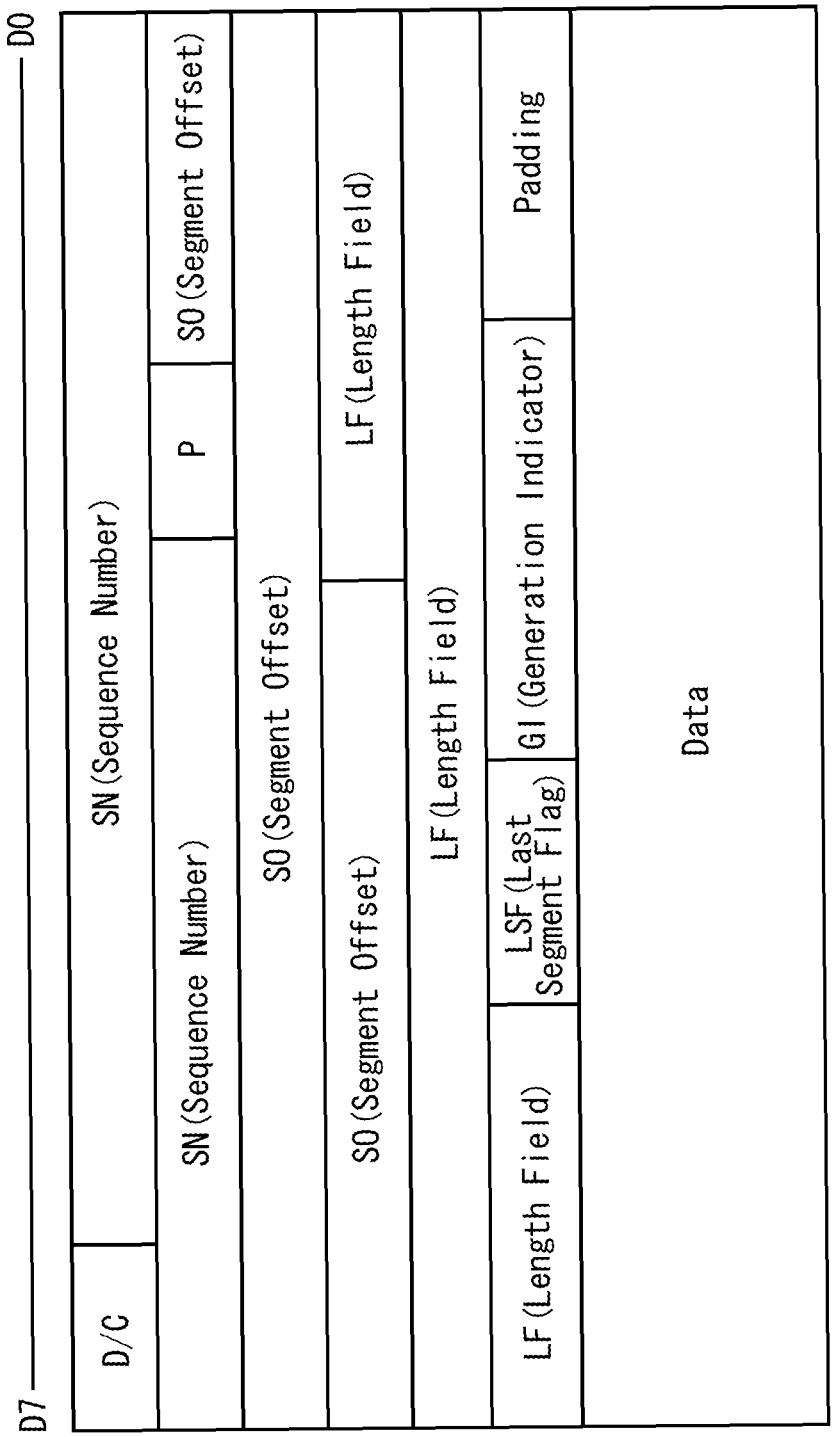
FIG. 8 is a first example of a format of the RLC Sub PDU.

FIG. 8 shows a first example of a format of the RLC Sub PDU according to the embodiment. The RLC Sub PDU includes, in the header, a GI (Generation Indicator) as retransmission identification information (generation identification information) as well as a sequence number SN, a segment offset SO, or the like. The RLC layer processing unit 22 of the wireless base station apparatus 20 of the transmitting side generates and transmits the RLC-Sub PDU added with the GI by giving it to the transmitting/receiving processing unit 23.

On the other hand, the RLC layer processing unit 12 of the wireless communication terminal apparatus 10 as the receiving side recognizes that an expected (assumed) value of the generation identification information GI of the received RLC Sub PDU is "0 (default value)" before the retransmit request is performed. A predetermined value (e.g., 1) is added to the assumed value of the retransmission generation identification information GI included in the received RLC Sub PDU every time when the retransmit request (STATUS PDU (NACK) transmission) is performed with respect to same RLC PDU. The assumed value can be stored in the memory unit 11 and can also be stored in a register provided in the RLC layer processing unit 12 itself.

Therefore, the RLC layer processing unit 22 of the wireless base station apparatus 20 (if the transmitting side has the RLC layer processing unit 12, the receiving side has the RLC layer processing unit 22) adds the GI to the RLC Sub PDU and receives the STATUS PDU (NACK) from the RLC control unit 12 of the receiving side. The GI value of the RLC Sub PDU to be retransmitted is updated to the value according to the number of the retransmission to be transmitted every time the RLC Sub PDU to be retransmitted is retransmitted.

The RLC layer processing unit 12 of the receiving side refers to the GI, included in the received RLC Sub PDU having the same sequence number as that of the RLC PDU to be generated, in order to determine whether or not the RLC Sub PDU having the same GI as an assumed GI (e.g., the GI stored in the memory unit 11, the register or the like) is received. If it is determined that the RLC Sub PDU having the same GI as the assumed GI is received, the RLC layer processing unit 12 generates an RLC PDU by including this RLC Sub PDU to the combination.

Figure 9:
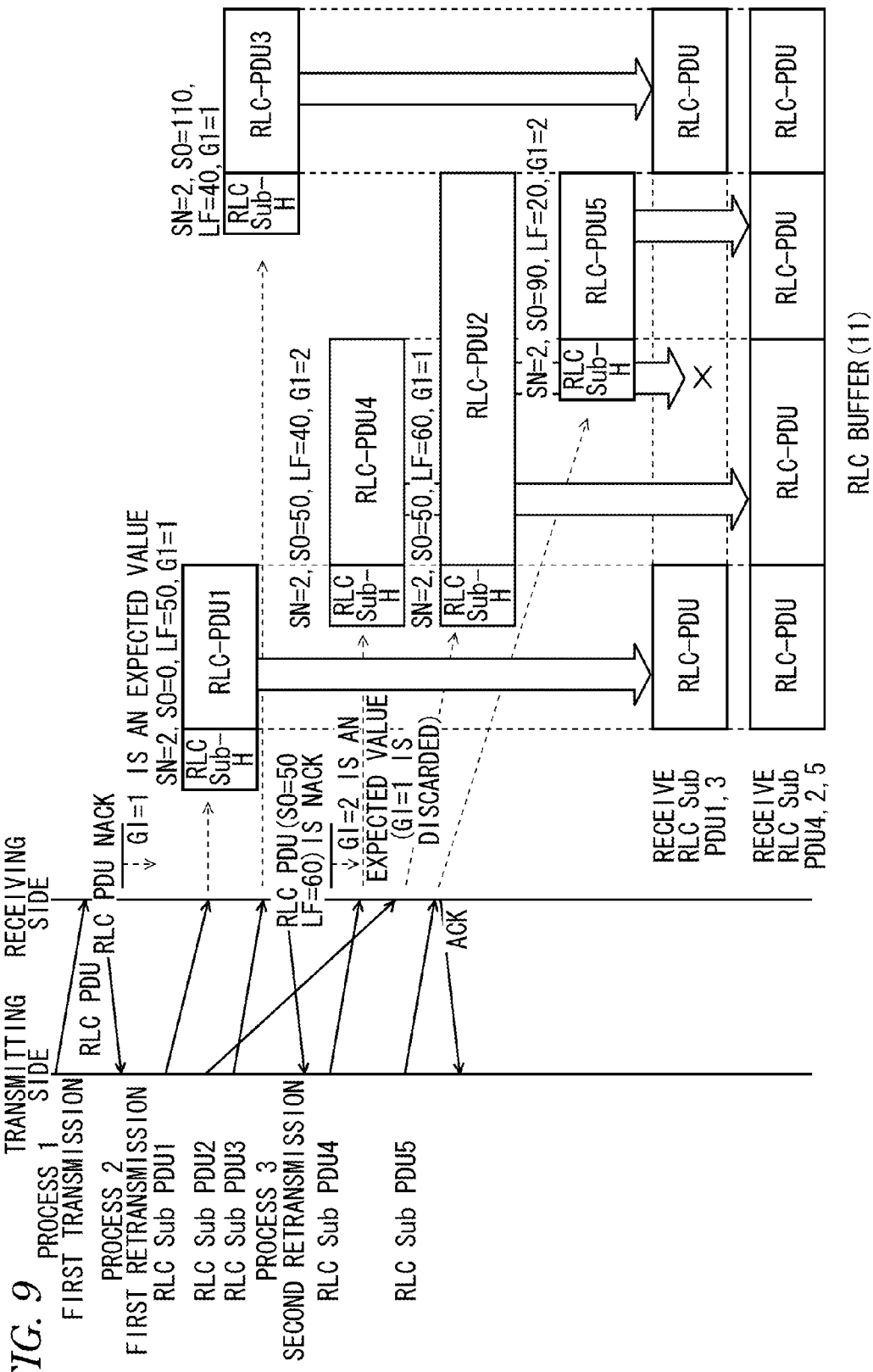
FIG. 9 is a first example of an operation of an RLC layer processing unit.

Further detailed description is explained by using FIG. 9.

FIG. 9 shows a first example of an operation of the RLC layer processing unit 12.

In FIG. 9, the wireless base station apparatus 20 of the transmitting side transmits an RLC PDU with the SN=2 in a first transmission (Process 1 in FIG. 9). However, the wireless communication terminal apparatus 10 could not receive the RLC PDU successfully, so that a STATUS-PDU (NACK) is transmitted in FIG. 9. The wireless base station apparatus 20 detects a necessity of retransmission by receiving this STATUS-PDU (NACK) and performs the retransmission of the RLC PDU with the SN=2. At this time, however, the RLC PDU with the SN=2 is divided into three, i.e., the RLC PDUs 1, 2 and 3, and transmitted as a first retransmission (a first retransmission control) (Process 2 in FIG. 9). That is, the RLC layer processing unit 22 of the wireless base station apparatus 20 generates and transmits the RLC Sub PDUs 1, 2 and 3 having the sequence number SN=2, the segment offset SO, the length field LF, and the identification information GI in the header thereof by giving it to the transmitting/receiving processing unit 23. In this case, the RLC Sub PDUs 1, 2 and 3 all have the GI=1 because the retransmission is the first retransmission.

On the other hand, the RLC layer processing unit 12 of the wireless communication terminal apparatus as the receiving side also expects that the RLC Sub PDU having the retransmission identification information (generation identification information) GI=1 is received because the RLC layer processing unit 12 of the receiving side also expects the first retransmission of the RLC Sub PDU with the SN=2.

The RLC layer processing unit 12 of the wireless communication terminal apparatus 10 sequentially receives the transmitted RLC Sub PDUs and confirms that the GI included in the received RLC Sub PDU is "1" as assumed and stores the RLC Sub PDU in the RLC buffer 11.

In FIG. 9, the wireless communication terminal apparatus 10 transmits the retransmit request by transmitting the STATUS-PDU (NACK) added with the lacking information (information which indicates which part of the RLC PDU having the SN=2 is lacked by the SO=50 and the LF=60) to the wireless base station apparatus 20. The wireless base station apparatus 20 receives the STATUS-PDU (NACK) in FIG. 9, and performs the retransmission of the part of the RLC PDU with the SN=2 wherein the part is defined by the SO=50 and the LF=60. At this time, at the transmitting side, the RLC Sub PDU2 is divided into two in order to generate the RLC Sub PDU4 and the RLC Sub PDU5 and the RLC Sub PDU4 and the RLC Sub PDU5 are transmitted in the second retransmission (Process 3 in FIG. 9). In this case, GI for the second retransmission is set to 2 (1+1) by added "1" to the GI ("1") for the first retransmission, and the RLC Sub PDU with the GI=2 is retransmitted as the second retransmission. The division number may vary in real time depending on the condition and the quality of the radio link.

Since a second retransmit request is transmitted, the RLC layer processing unit 12 of the wireless communication terminal 10 updates the GI=2 which is obtained by adding "1" to the prior assumed value "1" and stands by for the reception of the RLC Sub PDU with the GI=2.

Then the RLC layer processing unit 12 receives the RLC Sub PDU2 with the SN=2 and the GI=1. Since the GI included in the RLC Sub PDU2 is "1" which is different from the assumed GI value "2" (the updated assumed GI value), the RLC Sub PDU2 with the GI=1 is discarded and is not stored in the memory unit 11.

At the same time, the RLC layer processing unit 12 receives the RLC Sub PDUs 4 and 5 with the SN=2 and the GI=2. Each GI value included in the RLC Sub PDUs 4 and 5 is identical to the assumed GI value "2". Accordingly, the RLC Sub PDUs 4 and 5 are stored in the memory unit 11.

Even though the description is omitted here, the RLC layer processing unit 22 of the wireless base station apparatus 20 adds another "1" to the GI value and similarly performs an retransmitting processing with the GI=3 when the RLC Sub PDU is further lacking and another retransmission control is performed. The RLC layer processing unit 12 of the wireless communication terminal apparatus 10 refers to the GI included in the retransmitted RLC Sub PDU. If the GI is identical to the assumed GI value, the control is performed to use this RLC Sub PDU to generate an RLC PDU.

If the RLC Sub PDU has variable length and the division form of the RLC PDU varies every time when the RLC Sub PDU is retransmitted, handling the RLC Sub PDU is complicated if the reception sequence is disrupted as described above. According to the present embodiment, it is possible to prevent from combining the duplicative receive data of the RLC Sub PDU by using received data to generate an RLC PDU when the GI included in the received data (RLC Sub PDU) is identical to the assumed GI. This makes it possible to generate an RLC PDU correctly.

Second Example of a Format of RLC Sub PDU

Figure 10:
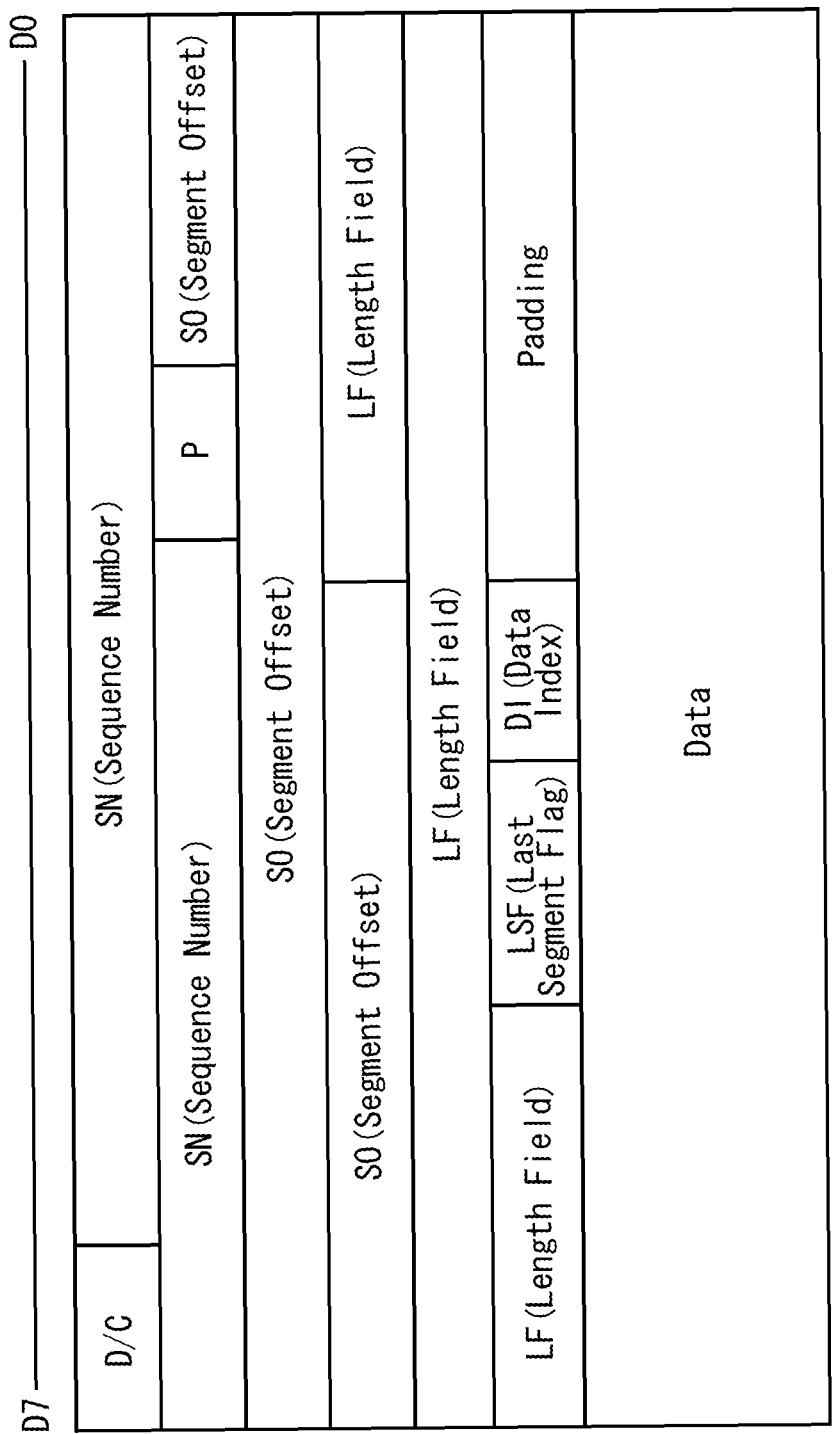
FIG. 10 is a second example of a format of the RLC Sub PDU.

FIG. 10 shows a second example of a format of the RLC Sub PDU according to the embodiment. The RLC Sub PDU includes, in the header, a DI (Data Index) bit (binary information), which switches to 1/0 at each retransmission, as the identification information as well as the sequence number SN and the segment offset SO.

Before performing the retransmit request, the RLC layer processing unit 12 of the wireless communication terminal apparatus 10 sets the data index ID of the identification information of the received RLC Sub PDU to the assumed value, for example, "0 (default value)", and switches the assumed value of the DI bit to 1, 0, 1, 0 . . . . That is, the assumed DI bit is "1" in the first retransmission of the identical sequence number SN. The assumed DI bit is updated to "0" in the second retransmission.

The DI bit is added by the RLC layer processing unit 22 of the wireless base station apparatus 20 of the transmitting side (the RCL layer processing unit 22 correspond to the receiving side when the RLC layer processing unit 12 corresponds to the receiving side), and the wireless base station apparatus 20 receives the STATUS PDU (NACK) from the RLC layer processing unit 12 of the wireless communication terminal apparatus 10 of the receiving side and transmits the DI bit switching to 1 or 0 every time when the RLC Sub PDU to be retransmitted is transmitted.

The RLC layer processing unit 12 of the receiving side refers to the DI bit of the received RLC Sub PDU in order to determine whether or not all the RLC Sub PDUs, in which the sequent numbers SN are identical, having the same ID bit are received. The RLC layer processing unit 12 generates an RLC PDU by combining the RLC Sub PDUs having the same DI bit.

When the DI bit switches to 0 or 1 as described above, the ID can be referred to as one of the retransmission identification information (generation identification information) in the sense of being capable of identifying a retransmission from the other retransmission.

According to the embodiments described above, it is possible to avoid confusion at the time of the data combination of a case when the plurality of retransmissions occur.

Furthermore, according to the embodiments described above, it is possible to identify whether or not the received RLC Sub PDU is transmitted based on a predetermined retransmit request by generation identification information included in the header of the RLC Sub PDU. Thus, an appropriate RLC PDU can be generated easily by combining the RLC Sub PDUs having the identical generation identification information.

Although the embodiments of the present invention has been described in detail, it should be understood that the various changes, substitutions, and alterations could be made hereto without departing from the spirit and scope of the invention.

What is claimed is:

1. A wireless communication apparatus which generates variable length Radio Link Control Sub Service Data Unit (RLC Sub PDU) data, the wireless communication apparatus comprising:
a generator configured to generate a plurality of RLC Sub PDU data by dividing a RLC PDU data; and
a processor configured to transmit the plurality of RLC Sub PDU data each of which is added with first generation identification information, and to transmit a RLC Sub PDU data to which second generation identification information, different from the first generation identification information, is added when the wireless communication apparatus receives a retransmission request with respect to any of the plurality of RLC Sub PDU data, wherein the RLC Sub PDU data to which the second generation identification information is added corresponds to data for which retransmission is requested by the retransmission request.

2. The wireless communication apparatus according to claim 1, wherein the second generation identification information is a value in which a predetermined value is added to the first generation identification information.

3. The wireless communication apparatus according to claim 1, wherein the first generation identification information and the second generation identification information are binary information, and the first generation identification information is one of a binary value and the second generation identification information is the other binary value.

4. A wireless communication apparatus which receives data related to an $M+1^{th}$ retransmission performed in response to a second retransmit request of the data related to an $M^{th}$ retransmission performed in response to a first retransmit request, the wireless communication apparatus comprising:
a processor configured to refer to identification information added to received retransmit data when the second retransmit request is performed after the first transmit request is performed, and, said processor is further configured to not use the received retransmit data for forming data when the received retransmit data corresponds to the first retransmit request based on the identification information, and use the received retransmit data for forming data when the received retransmit data corresponds to the second retransmit request based on the identification information.

5. The wireless communication apparatus according to claim 4, wherein the processor discards the received retransmit data without using the received retransmit data for forming data when the received retransmit data corresponds to the first retransmit request based on the identification information.

6. A wireless communication apparatus which receives variable length Radio Link Control Sub Service Data Unit (RLC Sub PDU) data and generates a RLC PDU data based on the received RLC Sub PDU data, the wireless communication apparatus comprising:
a memory unit; and
a retransmission control unit configured to refer to generation identification information included in the received RLC Sub PDU data to determine whether or not the generation identification information corresponds to an expected generation identification information, and to store the RLC Sub PDU data in the memory unit if the generation identification information corresponds to the expected generation identification information and to generate RLC PDU data based on the data stored in the memory unit.

7. The wireless communication apparatus according to claim 6, wherein the retransmission control unit updates the expected value every time a retransmit request is transmitted.

8. The wireless communication apparatus according to clam 6, wherein the retransmission control unit informs an expected value that is expected in a next retransmission performed in response to a retransmit request every time a retransmit request is transmitted.

9. The wireless communication apparatus according to clam 6, wherein an update is performed by increasing the expected value by a predetermined unit value.

10. The wireless communication apparatus according to clam 6, wherein the update is performed by switching the expected value back and forth between binaries.

11. A method for generating variable length Radio Link Control Sub Service Data Unit (RLC Sub PDU) data, the method comprising:
   generating a plurality of RLC Sub PDU data by dividing a RLC PDU data;
   transmitting the plurality of RLC Sub PDU data each of which is added with first generation identification information; and
   transmitting a RLC Sub PDU data to which second generation identification information, different from the first generation identification information, is added when a retransmission request is received with respect to any of the plurality of RLC Sub PDU data,
   wherein the RLC Sub PDU data to which the second generation identification information is added corresponds to data for which retransmission is requested by the retransmission request.

12. The method according to claim 11, wherein the second generation identification information is a value in which a predetermined value is added to the first generation identification information.

13. The method according to claim 11, wherein the first generation identification information and the second generation identification information are binary information, and the first generation identification information is one of a binary value and the second generation identification information is the other binary value.

14. A method for receiving data related to an M+1$^{th}$ retransmission performed in response to a second retransmit request of the data related to an M$^{th}$ retransmission performed in response to a first retransmit request, the method comprising:
   referring to identification information added to received retransmit data when the second retransmit request is performed after the first transmit request is performed; and,
   forming data without using the received retransmit data when the received retransmit data corresponds to the first retransmit request based on the identification information, and using the received retransmit data for forming data when the received retransmit data corresponds to the second retransmit request based on the identification information.

15. The method according to claim 14, further comprising:
   discarding the received retransmit data without using the received retransmit data for forming data when the received retransmit data corresponds to the first retransmit request based on the identification information.

* * * * *